(12) United States Patent
Chen et al.

(10) Patent No.: US 8,059,198 B2
(45) Date of Patent: Nov. 15, 2011

(54) APPARATUS AND METHOD FOR MOTION ADAPTIVE DE-INTERLACING WITH CHROMA UP-SAMPLING ERROR REMOVER

(75) Inventors: Ying-Ru Chen, Tainan County (TW); Ling-Hsiu Huang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 559 days.

(21) Appl. No.: 12/352,263

(22) Filed: Jan. 12, 2009

(65) Prior Publication Data

US 2010/0177241 A1    Jul. 15, 2010

(51) Int. Cl.
*H04N 11/20* (2006.01)
*H04N 7/01* (2006.01)
(52) U.S. Cl. .................... 348/451; 348/452
(58) Field of Classification Search .......... 348/451–453, 348/448, 458, 607, 624; 382/299, 300
See application file for complete search history.

(56) References Cited

U.S. PATENT DOCUMENTS

| 5,995,154 | A | * | 11/1999 | Heimburger | 348/448 |
| 7,876,378 | B1 | * | 1/2011 | Lew et al. | 348/420.1 |
| 2005/0030422 | A1 | * | 2/2005 | Leone et al. | 348/441 |
| 2006/0153476 | A1 | * | 7/2006 | Munsil et al. | 382/299 |
| 2009/0079867 | A1 | * | 3/2009 | Leone et al. | 348/453 |

* cited by examiner

*Primary Examiner* — Victor Kostak
(74) *Attorney, Agent, or Firm* — J.C. Patents (57) ABSTRACT

An apparatus and a method for motion adaptive de-interlacing with chroma up-sampling error remover are provided. Wherein, a motion detector determines moving pixels and static pixels in a target scan line. A first CUE remover and a second CUE remover remove the CUE of the target scan line in the previous field and the CUE of the adjacent scan lines in the current field, respectively. A de-interlace unit de-interlaces the adjacent scan lines to obtain a de-interlaced second scan line. A selector selects output data of the first CUE remover or the de-interlace unit as data of the target scan line according to a result of motion detection of the motion detector. A merging unit merges the adjacent scan line output by the second CUE remover and the target scan line output by the selector to output two scan lines of an output field.

16 Claims, 6 Drawing Sheets

APPARATUS AND METHOD FOR MOTION ADAPTIVE DE-INTERLACING WITH CHROMA UP-SAMPLING ERROR REMOVER

BACKGROUND OF THE INVENTION

1. Field of the Invention

The present invention generally relates to an apparatus and a method of motion detection, and more particularly, to an apparatus and a method for motion adaptive de-interlacing with a chroma up-sampling error remover.

2. Description of Related Art

Generally speaking, motion detection uses differences between corresponding pixels in the same parity field to determine whether the designated pixels are moving pixels or not. If the difference is larger than a preset threshold, it means a variation is occurred in the content of the video and the corresponding pixels are determined as the moving pixels, and if the difference is smaller than the preset threshold, it means no variation is occurred in the content of the video and the corresponding pixels are determined as the static pixels.

Through the motion detection as described above, motion information of pixels of the moving object is obtained and referenced for determining whether to use a spatial interpolation or a temporal interpolation method to generate the required field data, in which the temperal interpolation is used for calculating values of pixels in an area with no moving object and the spacial interpolation is used for calculating values of pixels in an area with the moving object.

On the other hand, in order to reduce a size of a video, the color components of the video are usually compressed in the 4:2:0 sampling format. To be specific, based on the characteristic of human eyes that is insensitive to color components, the color components of the video data is usually sub-sampled such that only a part of color information is retained. The common sub-sampling formats includes a 4:2:2 sampling format, a 4:1:1 sampling format, and a 4:2:0 sampling format.

For example, in the process of 4:2:2 sub-sampling for pixels containing color components of R, G, and B, the color components of R, G, and B are equivalently transformed into a luminance Y and color components U and V, and the color components of the pixels are sampled by two. That is, for each two pixels, only the color components of one pixel is sampled and used as the color components of the two pixels.

However, when performing three dimensional de-interlacing on a video compressed in a 4:2:0 sampling format, if the color components of corresponding pixels of a static area in a front field and a rear field are combined together for display, a chroma up-sampling error (CUE) may occur.

Figure 1:
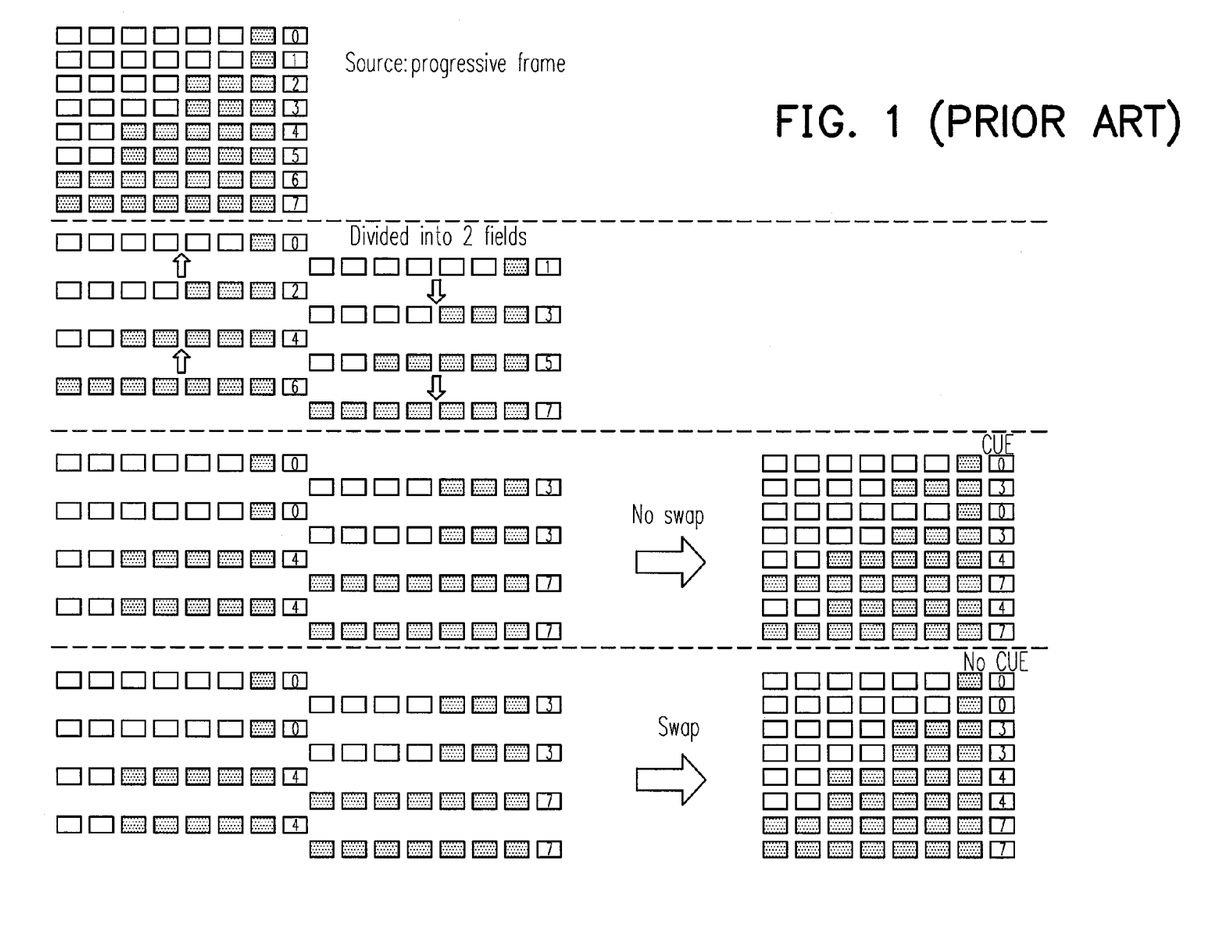
FIG. 1 is an example illustrating a chroma up-sampling error occurred when performing de-interlacing.

For example, FIG. 1 is an example illustrating a chroma up-sampling error occurred when performing de-interlacing. Referring to FIG. 1, when performing interlacing on a progressive field having a size of 8×8, the scan lines are separated into an odd field and an even field, in which the odd field contains odd scan lines of the progressive field, the even field contains even scan lines of the progressive field, and the pixels drawn with shadow blocks represent color pixels. Then, when performing a 4:2:0 sub-sampling on both the odd field and the even field, data of one of each two scan lines is retained and used as the data of the two scan lines, so as to reduce the size of the original field. However, when performing de-interlacing on the sub-sampled odd field and even field, the scan lines of the odd field and the even field are up-sampled alternately to recover the field. As shown in the third section of FIG. 1, the color pixels are mistakenly arranged such that saw-tooth may occur on the edge of the color area in the recovered field.

To resolve the CUE problem as described above, the conventional technique uses a low pass filter for up-sampling, but this method may blur the outline with apparent color change in the field. To resolve the problem thoroughly, the components of the pixels of the color area in the front field and in the rear field are required to be swapped as shown in the fourth section of FIG. 1. In detail, the components of the pixels in the odd field are required to be swapped with those of pixels in a next field and the components of the pixels in the even field are required to be swapped with those of pixels in a previous field.

However, the motion adaptive de-interlacing requires data of at least three fields so as to precisely detect the static areas and the moving areas because the motion detection needs to use same parity field. If it intends to remove the CUE in the input three fields so as to perform motion detection, data of at least five fields are required, which expends large volume of buffer.

SUMMARY OF THE INVENTION

In light of the above, the present invention provides an apparatus for motion adaptive de-interlacing with a chroma up-sampling error (CUE) remover, in which the usage of buffer can be relatively reduced.

The present invention provides a method for motion adaptive de-interlacing with a CUE remover, correct de-interlaced field data can be obtained based on only three adjacent fields.

In order to achieve the above-mentioned or other objects, the present invention provides an apparatus for motion adaptive de-interlacing with a CUE remover. The apparatus comprises a motion detector, a first CUE remover, a second CUE remover, a de-interlace unit, a selector and a merging unit. Wherein, the motion detector receives data of a current field, a previous field and a next field, and determines whether a plurality of pixels between a first scan line and a third scan line in the current field are moving pixels or static pixels. The first CUE remover receives data of the current field and the previous field, and removes the CUE of a second scan line in the previous field, in which the second scan line is between the first scan line and the third scan line. The second CUE remover receives data of the current field and the next field, and removes the CUE of the first scan line and the third scan line in the current field. The de-interlace unit is coupled to the second CUE remover and receives data of the processed first scan line and third scan line, and uses the first scan line and the third scan line to interpolate a de-interlaced second scan line. The selector is coupled to the motion detector, the first CUE remover and the de-interlace unit, and used for selecting output data of the first CUE remover or the de-interlace unit as data of the second scan line according to a result of motion detection of the motion detector. The merging unit is coupled to the second CUE remover and the selector, and used for merging the first scan line output by the second CUE remover and the second scan line output by the selector so as to output two scan lines of an output field.

According to an embodiment of the present invention, the motion detector determines whether the pixels between the first scan line and the third scan line in the current field are moving pixels or static pixels according to a plurality of differences between two adjacent fields.

According to an embodiment of the present invention, the motion detector determines the moving pixels or the static pixels according to the differences between two adjacent fields.

According to an embodiment of the present invention, the selector selects the output data of the first CUE remover as the data of the second scan line if the motion detector detects the pixels between the first scan line and the third scan line in the current field are static pixels.

According to an embodiment of the present invention, the selector selects the output data of the de-interlace unit as the data of the second scan line if the motion detector detects the pixels between the first scan line and the third scan line in the current field are moving pixels.

According to an embodiment of the present invention, the first CUE remover detects the CUE of the second scan line in the previous field and swaps color components of the second scan line in the previous field with those of the first scan line or the third scan line in the current field if the CUE of the second scan line is detected.

According to an embodiment of the present invention, the second CUE remover detects the CUE of the first scan line in the current field and swaps color components of the first scan line in the current field with those of a scan line previous to the first scan line or the second scan line in the next field if the CUE of the first scan line is detected.

According to an embodiment of the present invention, the second CUE remover detects the CUE of the third scan line in the current field and swaps color components of the third scan line in the current field with those of the second scan line or a scan line next to the third scan line in the next field if the CUE of the third scan line is detected.

The present invention provides a method for motion adaptive de-interlacing with a CUE remover. First, it is determined whether a plurality of pixels between a first scan line and a third scan line in a current field are moving pixels or static pixels. The CUE of a second scan line in a previous field is removed and the CUE of the first scan line and the third scan line in the current field is also removed, in which the second scan line is between the first scan line and the third scan line. Then, the first scan line and the third scan line are used to interpolate a de-interlaced second scan line. According to a determination of whether the pixels between the first scan line and the third scan line in the current field are moving pixels or static pixels, data of the second scan line with the CUE being removed or the de-interlaced second scan line is selected as data of the second scan line. Finally, the first scan line with the CUE being removed and the selected second scan line are merged so as to output two scan lines of an output field.

According to an embodiment of the present invention, the determination of whether the pixels between the first scan line and the third scan line in the current field are moving pixels or static pixels is based a plurality of differences between two adjacent fields.

According to an embodiment of the present invention, in the step of selecting data of the second scan line with the CUE being removed or the de-interlaced second scan line as data of the second scan line, data of the second scan line with the CUE being removed is selected as the data of the second scan line if the pixels between the first scan line and the third scan line in the current field are determined as static pixels. On the other hand, data of the de-interlaced second scan line is selected as the data of the second scan line if the pixels between the first scan line and the third scan line in the current field are determined as moving pixels.

According to an embodiment of the present invention, in the step of removing the CUE of the second scan line in the previous field, the CUE of the second scan line in the previous field is detected and the color components of the second scan line in the previous field are swapped with those of the first scan line or the third scan line in the current field if the CUE of the second scan line is detected.

According to an embodiment of the present invention, in the step of removing the CUE of the first scan line in the current field, the CUE of the first scan line in the current field is detected and color components of the first scan line in the current field are swapped with those of a scan line previous to the first scan line or the second scan line in the next field if the CUE of the first scan line is detected.

According to an embodiment of the present invention, in the step of removing the CUE of the third scan line in the current field, the CUE of the third scan line in the current field is detected and color components of the third scan line in the current field are swapped with those of the second scan line or a scan line next to the third scan line in the next field if the CUE of the third scan line is detected.

In the present invention, two CUE removers are used to remove CUE in the current field and the previous field respectively and data of a target scan line is obtained by spatial interpolation or temporal interpolation according to a result of motion detection performed on the target scan line. Accordingly, correct de-interlaced field data can be obtained based on only three adjacent fields, and the usage of buffer can be relatively reduced.

In order to make the aforementioned and other objects, features, and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In general, data used in the motion adaptive de-interlacing is obtained by spatial interpolation or temporal interpolation. In order to use the least buffer to resolve the chroma up-sampling error (CUE) in the de-interlacing process, the present invention only uses data of a previous field in temporal interpolation instead of using averages between data of a front field and a rear field, such that the usage of buffer can be relatively reduced. In order to make the present invention more comprehensible, embodiments are described below as the examples to prove that the invention can actually be realized.

Figure 2:
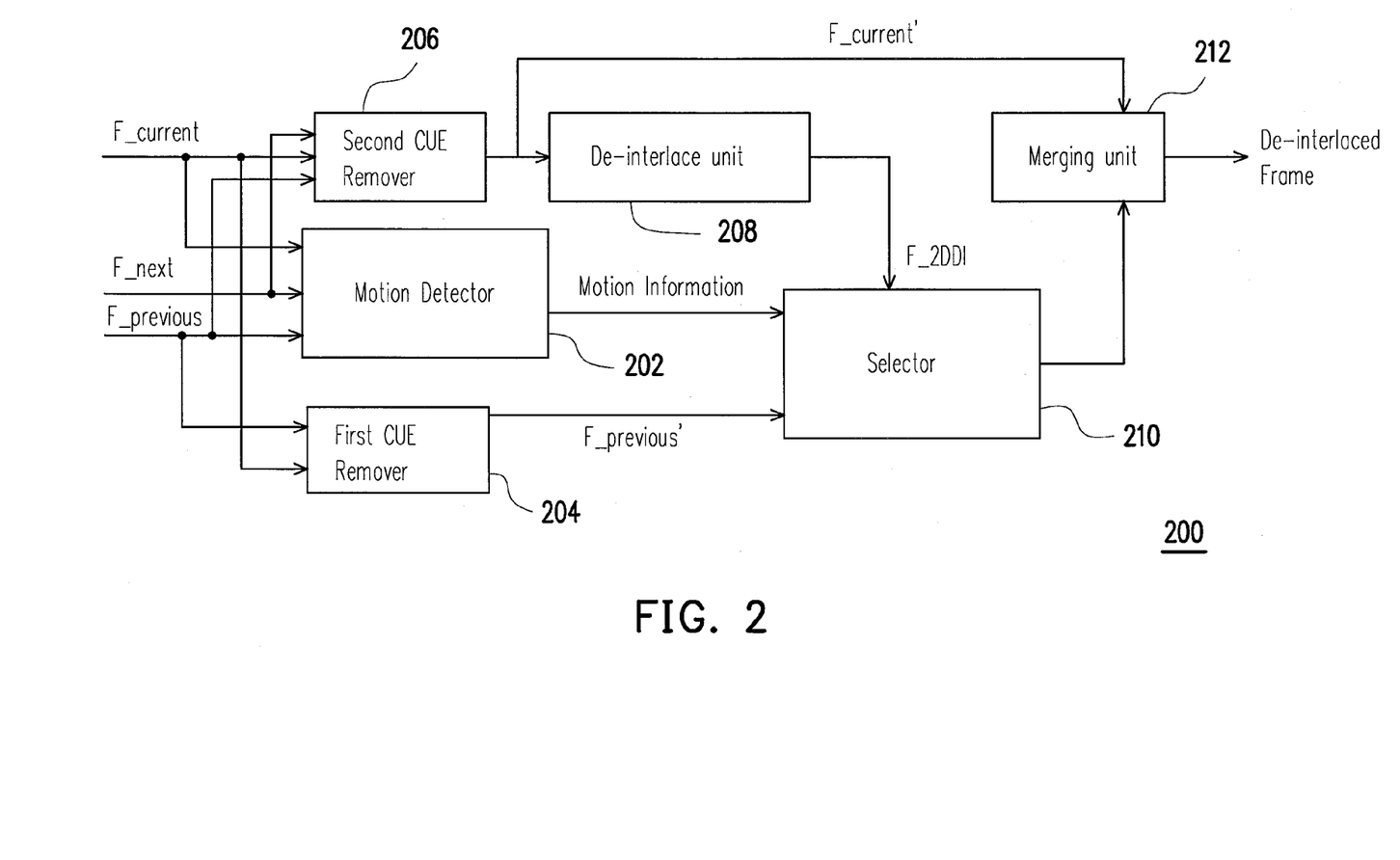
FIG. 2 is a block diagram illustrating a motion adaptive de-interlacing apparatus according to one embodiment of the present invention.

FIG. 2 is a block diagram illustrating a motion adaptive de-interlacing apparatus according to one embodiment of the present invention. Referring to FIG. 2, the motion adaptive de-interlacing apparatus 200 includes a motion detector 202, a first CUE remover 204, a second CUE remover 206, a de-interlace unit 208, a selector 210 and a merging unit 212. The functions of the above elements are described respectively in the following content.

The motion detector 202 receives data of a current field, a previous field and a next field, and uses the same to determine whether a plurality of pixels between a first scan line and a third scan line in the current field are moving pixels or static pixels. To be specific, the first scan line and the third scan line are two adjacent scan lines in the current field and the scan line therebetween, that is, the second scan line, is a target scan line to be obtained through spatial interpolation or temporal interpolation. In detail, if the pixels in the second scan line is determined as the moving pixels, the data thereof can be obtained through spatial interpolation of the first scan line and the third scan line in the current field. On the contrary, if the pixels in the second scan line is determined as the static pixels, the data thereof can be obtained through temporal interpolation of the corresponding second scan line in the previous field or the next field.

Figure 3:
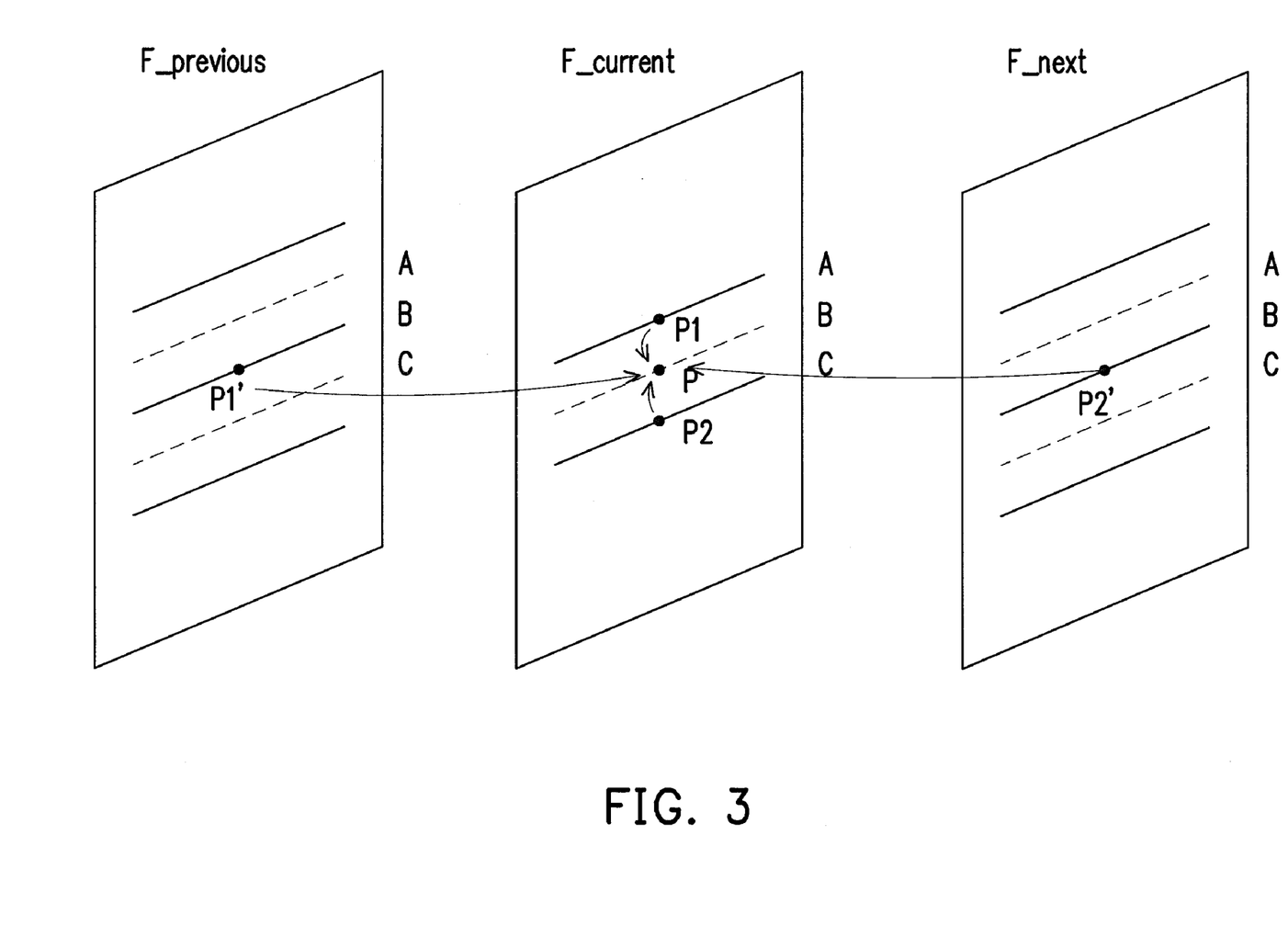
FIG. 3 is a schematic diagram illustrating a method for performing spatial interpolation and temporal interpolation by using data of three adjacent fields according to one embodiment of the present invention.

For example, FIG. 3 is a schematic diagram illustrating a method for performing spatial interpolation and temporal interpolation by using data of three adjacent fields according to one embodiment of the present invention. Referring to FIG. 3, it is assumed that a pixel P in a scan line B of a current field F_current is the designate pixel to be calculated through spatial interpolation or temporal interpolation. If the pixel P is determined as a moving pixel, the spatial interpolation is adopted and the pixel P can be obtained by the interpolation of pixel P1 in the scan line A of the current field F_current and pixel P2 in the scan line C of the current field F_current. On the contrary, if the pixel P is determined as a static pixel, the temporal interpolation is adopted and the pixel P can be obtained by the interpolation of pixel P1' in the scan line B of a previous field F_previous and pixel P2' in the scan line B of a next field F_next.

Accordingly, the motion detector 202 determines whether the pixels between the first scan line and the third scan line in the current field are moving pixels or static pixels according to a plurality of differences between two adjacent fields. Wherein, the motion detector 202 may determine the moving pixels or the static pixels according to the differences between the two adjacent fields.

The present embodiment uses data of three adjacent fields to perform motion detection. However, since the motion adaptive de-interlacing requires data from spatial interpolation of a two-dimensional field or data of the pixel at corresponding position in the previous field (temporal interpolation), data of luminance and color components in the result of the spatial interpolation or data of the previous field should be all correct, such that the motion detection can be performed properly. Therefore, CUE removers are required to remove the CUE in the previous field, the current field and the next field before the process of de-interlacing.

For performing the temporal interpolation, the data of the previous field P_previous should be correct and the CUE existed therein should be removed. Accordingly, the first CUE remover 204 receives data of the current field P_current and the previous field P_previous, and then removes the CUE of a second scan line in the previous field P_previous accordingly. In general, to remove the CUE in the previous field P_previous, data of its previous field and next field are required. However, the motion adaptive de-interlacing only uses data of a static area in the previous field, and if the content of the previous field F_previous is static, data of its previous field and next field are all the same, such that a next field of the previous field P_previous, that is, the current field F_current, is required to swap with the previous field P_previous, so as to obtain correct color components of the previous field P_previous'.

Figure 4:
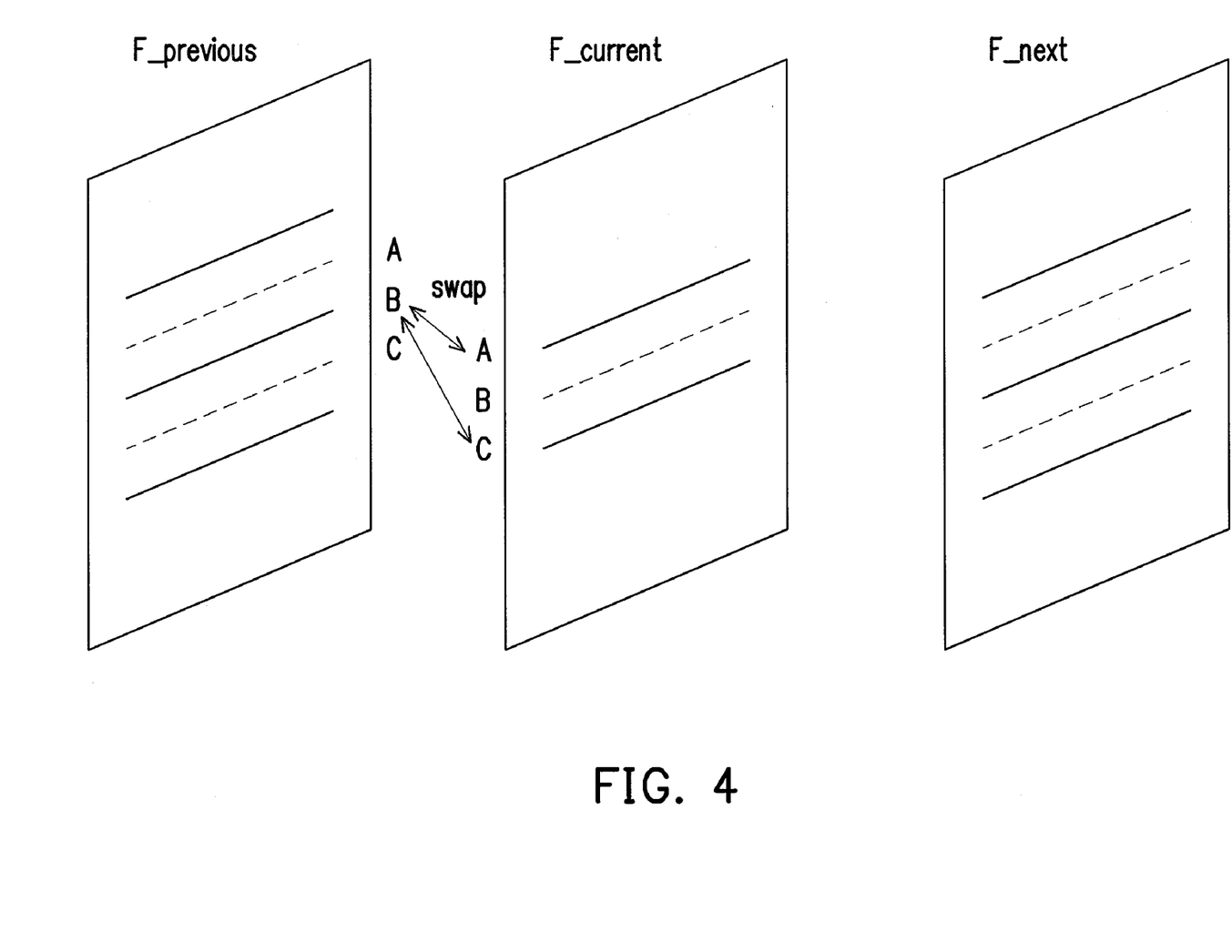
FIG. 4 is a schematic diagram illustrating a method for removing CUE of scan lines in a previous field according to one embodiment of the present invention.

For example, FIG. 4 is a schematic diagram illustrating a method for removing CUE of scan lines in a previous field according to one embodiment of the present invention. Referring to FIG. 4, it is assumed that scan line B in the previous field F_previous is in a static area. When performing CUE removing, the scan line B in the previous field F_previous is swapped with the scan line A or scan line C in the current field F_current.

For performing a two-dimensional de-interlacing (2DDI), that is, the spatial interpolation, the data of the current field P_current should be correct and the CUE existed therein should be removed. The second CUE remover 206 receives data of the current field F_current and the next field F_next, and removes the CUE of the first scan line and the third scan line in the current field F_current. In detail, before performing two-dimensional de-interlacing, erroneous color components of the current field P_current should be swapped with the color components of the previous field P_previous or the color components of the next field F_next so as to obtain correct color components of the current field P_current'.

In detail, the second CUE remover 206 detects the CUE of the first scan line in the current field F_current and swaps color components of the first scan line in the current field F_current with those of a scan line previous to the first scan line or the second scan line in the previous field F_previous or the next field F_next if the CUE of the first scan line is detected. Moreover, the second CUE remover 206 also detects the CUE of the third scan line in the current field F_current and swaps color components of the third scan line in the current field F_current with those of the second scan line or a scan line next to the third scan line in the previous field F_previous or the next field F_next if the CUE of the third scan line is detected.

Figure 5:
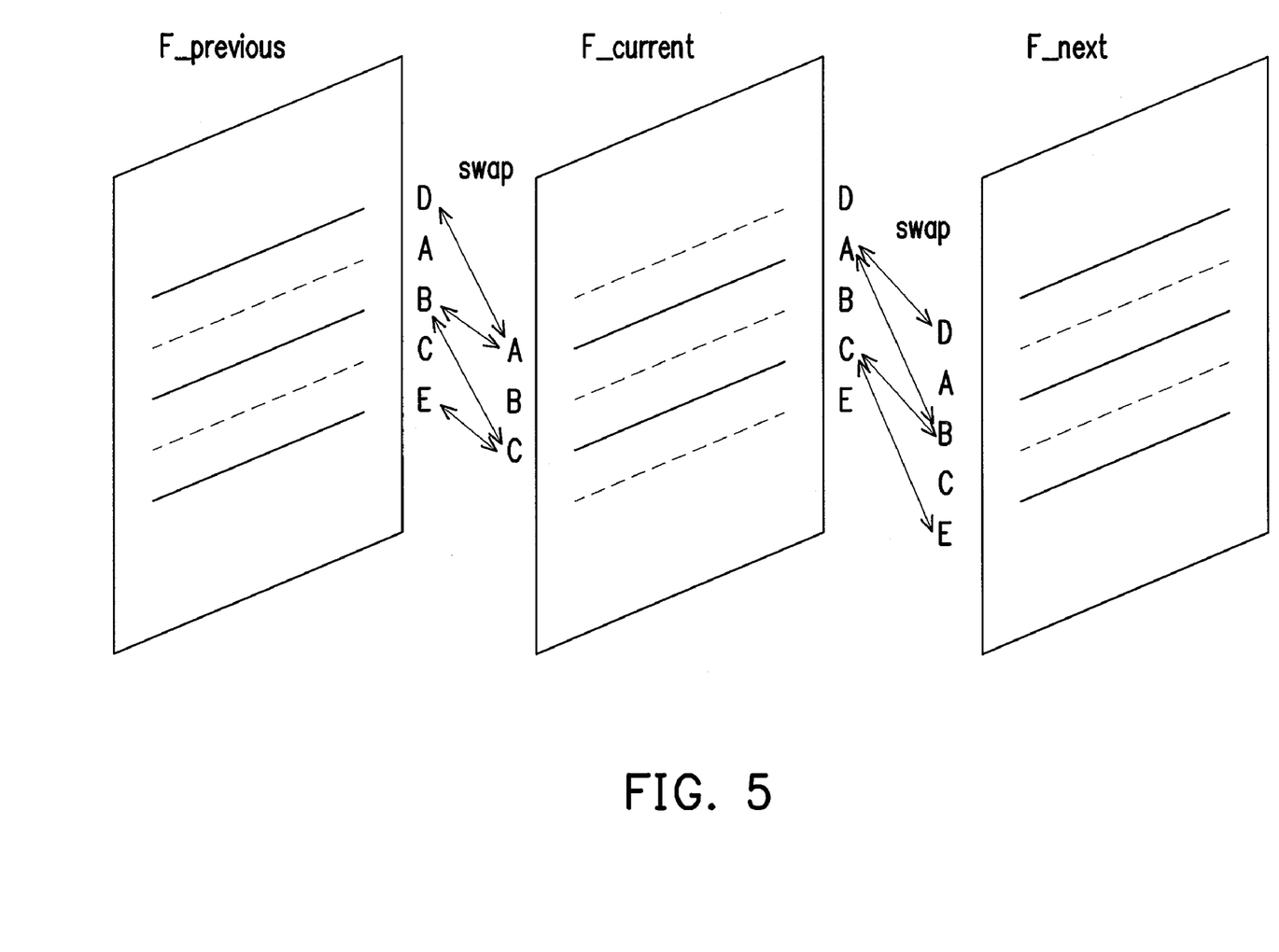
FIG. 5 is a schematic diagram illustrating a method for removing CUE of scan lines in a current field according to one embodiment of the present invention.

For example, FIG. 5 is a schematic diagram illustrating a method for removing CUE of scan lines in a current field according to one embodiment of the present invention. Referring to FIG. 5, it is assumed that a scan line A and a scan C in the current field F_current are in a static area. When performing CUE removing, the scan line A in the current field F_current can be swapped with a scan line D or the scan line B in the previous field F_previous, or swapped with the scan line D or the scan line B in a next field F_next. Moreover, the scan line C in the current field F_current can be swapped with a scan line B or the scan line E in the previous field F_previous, or swapped with the scan line B or the scan line E in a next field F_next.

The data of the current field P_current' output by the second CUE remover 206 is then input into the de-interlace unit 208 for de-interlacing. To be specific, the de-interlace unit 208 receives data of the processed first scan line and third scan line of the current field P_current', and uses the first scan line and the third scan line to interpolate a de-interlaced second scan line of the current field P_current'.

The selector 210 receives motion information from the motion detector 202, data of the corrected previous field F_previous' and data of the current field after two-dimensional de-interlacing F_2DDI and adaptively selects output data of the first CUE remover 204 or the de-interlace unit 208 as data of the second scan line of the current field according to a result of motion detection of the motion detector 202. In detail, if the motion detector 202 detects the pixels between the first scan line and the third scan line in the current field F_current are static pixels, then the selector 210 selects the output data of the first CUE remover 204 as the data of the second scan line. On the other hand, if the motion detector 202 detects the pixels between the first scan line and the third scan line in the current field F_current are moving pixels, then the selector 210 selects the output data of the de-interlace unit 208 as the data of the second scan line.

The merging unit 212 merges the first scan line output by the second CUE remover 206 and the second scan line output by the selector 210 so as to output two scan lines of an output field. The de-interlacing process is repeated until all the scan lines of the current field F_current are processed and output, and finally a complete de-interlaced output field is obtained.

It should be noted herein that based on the above structure of apparatus for motion adaptive de-interlacing, the present invention provides corresponding method for performing motion adaptive de-interlacing therein. An embodiment is given below for further illustration.

Figure 6:
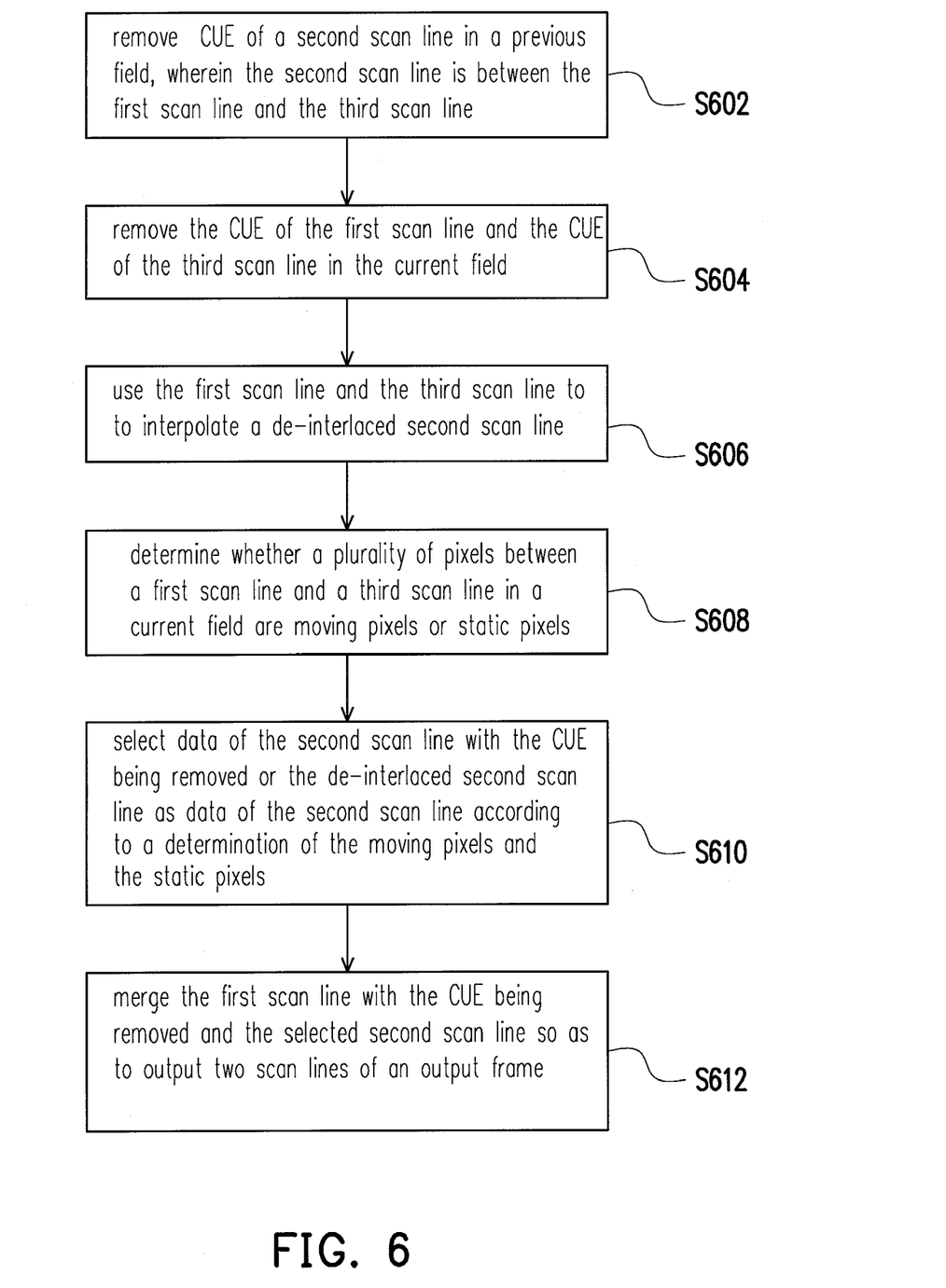
FIG. 6 is a flowchart illustrating a method for motion adaptive de-interlacing using a CUE remover according to one embodiment of the present invention.

FIG. 6 is a flowchart illustrating a method for motion adaptive de-interlacing using a CUE remover according to one embodiment of the present invention. Referring to FIG. 6, when performing de-interlacing process on each set of three adjacent scan lines, that are, a first scan line, a second scan line and a third scan line, the present embodiment first removes the CUE of a second scan line in a previous field (S602). To be specific, in the step S602, the CUE of the second scan line in the previous field is detected and if the CUE is detected, color components of the second scan line in the previous field are swapped with those of the first scan line or the third scan line in the current field.

Next, the CUE of the first scan line and the third scan line in the current field is removed (S604). Similarly, in the step S604, the CUE of the first scan line in the current field is detected and if the CUE is detected, color components of the first scan line in the current field are swapped with those of a scan line previous to the first scan line or the second scan line in the next field. Moreover, the CUE of the third scan line in the current field is also detected and if the CUE is detected, color components of the third scan line in the current field are swapped with those of the second scan line or a scan line next to the third scan line in the next field.

After the CUE is removed, the first scan line and the third scan line in the current field are then de-interlaced to obtain a de-interlaced second scan line (S606). Then, it is determined whether a plurality of pixels between a first scan line and a third scan line in a current field are moving pixels or static pixels (S608). In detail, the determination of whether the pixels between the first scan line and the third scan line in the current field are moving pixels or static pixels is obtained based a plurality of differences between two adjacent fields, in which the differences means the differences of only luminances between two adjacent fields.

The determination is then used for selecting data of the second scan line with the CUE being removed or the de-interlaced second scan line as data of the second scan line to be output (S610). To be specific, if the pixels between the first scan line and the third scan line in the current field are determined as static pixels, then the data of the second scan line with the CUE being removed is selected as the data of the second scan line. However, if the pixels between the first scan line and the third scan line in the current field are determined as moving pixels, then the data of the de-interlaced second scan line is selected as the data of the second scan line.

Finally, the first scan line with the CUE being removed and the selected second scan line are merged so as to output two scan lines of an output field (S612). The aforesaid de-interlacing process is repeated until all the scan lines of the current field are processed and output, and finally a complete de-interlaced output field is obtained.

To sum up, the present invention provides an apparatus and a method for motion adaptive de-interlacing with a CUE remover, in which luminance of pixels in adjacent fields are used to determine the moving area and the static area, and color components of scan lines in the adjacent fields are swapped so as to remove CUE existed therein. Accordingly, correct de-interlaced field data can be obtained based on only three adjacent fields, and the usage of buffer can be relatively reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for motion adaptive de-interlacing with a chroma up-sampling error (CUE) remover, comprising:
   a motion detector for receiving data of a current field, a previous field and a next field, and determining whether a plurality of pixels between a first scan line and a third scan line in the current field are moving pixels or static pixels;
   a first CUE remover for receiving data of the current field and the previous field, and removing the CUE of a second scan line in the previous field, wherein the second scan line is between the first scan line and the third scan line;
   a second CUE remover for receiving data of the previous field, the current field and the next field, and removing the CUE of the first scan line and the third scan line in the current field;
   a de-interlace unit, coupled to the second CUE remover, for receiving data of the processed first scan line and third scan line, and using the first scan line and the third scan line to interpolate a de-interlaced second scan line;
   a selector, coupled to the motion detector, the first CUE remover and the de-interlace unit, for selecting output data of the first CUE remover or the de-interlace unit as data of the second scan line according to a result of motion detection of the motion detector; and
   a merging unit, coupled to the second CUE remover and the selector, for merging the first scan line output by the second CUE remover and the second scan line output by the selector so as to output two scan lines of an output field.

2. The apparatus for motion adaptive de-interlacing with a CUE remover according to claim 1, wherein the motion detector determines whether the pixels between the first scan line and the third scan line in the current field are moving pixels or static pixels according to a plurality of differences between two adjacent fields.

3. The apparatus for motion adaptive de-interlacing with a CUE remover according to claim 2, wherein the motion detector determines the moving pixels or the static pixels according to the differences between two adjacent fields.

4. The apparatus for motion adaptive de-interlacing with a CUE remover according to claim 1, wherein the selector selects the output data of the first CUE remover as the data of the second scan line if the motion detector detects the pixels between the first scan line and the third scan line in the current field are static pixels.

5. The apparatus for motion adaptive de-interlacing with a CUE remover according to claim 1, wherein the selector selects the output data of the de-interlace unit as the data of the second scan line if the motion detector detects the pixels between the first scan line and the third scan line in the current field are moving pixels.

6. The apparatus for motion adaptive de-interlacing with a CUE remover according to claim 1, wherein the first CUE remover detects the CUE of the second scan line in the previous field and swaps color components of the second scan line in the previous field with those of the first scan line or the third scan line in the current field if the CUE of the second scan line is detected.

7. The apparatus for motion adaptive de-interlacing with a CUE remover according to claim 1, wherein the second CUE remover detects the CUE of the first scan line in the current field and swaps color components of the first scan line in the current field with those of a scan line previous to the first scan line or the second scan line in the previous field or the next field if the CUE of the first scan line is detected.

8. The apparatus for motion adaptive de-interlacing with a CUE remover according to claim 1, wherein the second CUE remover detects the CUE of the third scan line in the current field and swaps color components of the third scan line in the current field with those of the second scan line or a scan line next to the third scan line in the previous field or the next field if the CUE of the third scan line is detected.

9. A method for motion adaptive de-interlacing with a CUE remover, comprising:
   determining whether a plurality of pixels between a first scan line and a third scan line in a current field are moving pixels or static pixels;
   removing the CUE of a second scan line in a previous field, wherein the second scan line is between the first scan line and the third scan line;
   removing the CUE of the first scan line and the third scan line in the current field;
   using the first scan line and the third scan line so as to interpolate a de-interlaced second scan line;
   selecting data of the second scan line with the CUE being removed or the de-interlaced second scan line as data of the second scan line according to a determination of whether the pixels between the first scan line and the third scan line in the current field are moving pixels or static pixels; and
   merging the first scan line with the CUE being removed and the selected second scan line so as to output two scan lines of an output field.

10. The method for motion adaptive de-interlacing with a CUE remover according to claim 9, wherein the determination of whether the pixels between the first scan line and the third scan line in the current field are moving pixels or static pixels is based a plurality of differences between two adjacent fields.

11. The method for motion adaptive de-interlacing with a CUE remover according to claim 10, wherein the determination of whether the pixels between the first scan line and the third scan line in the current field are moving pixels or static pixels is based the differences between two adjacent fields.

12. The method for motion adaptive de-interlacing with a CUE remover according to claim 9, wherein the step of selecting data of the second scan line with the CUE being removed or the de-interlaced second scan line as data of the second scan line according to a determination of whether the pixels between the first scan line and the third scan line in the current field are moving pixels or static pixels comprises:
   selecting data of the second scan line with the CUE being removed as the data of the second scan line if the pixels between the first scan line and the third scan line in the current field are determined as static pixels.

13. The method for motion adaptive de-interlacing with a CUE remover according to claim 9, wherein the step of selecting data of the second scan line with the CUE being removed or the de-interlaced second scan line as data of the second scan line according to a determination of whether the pixels between the first scan line and the third scan line in the current field are moving pixels or static pixels comprises:
   selecting data of the de-interlaced second scan line as the data of the second scan line if the pixels between the first scan line and the third scan line in the current field are determined as moving pixels.

14. The method for motion adaptive de-interlacing with a CUE remover according to claim 9, wherein the step of removing the CUE of the second scan line in the previous field comprises:
   detecting the CUE of the second scan line in the previous field; and
   swapping color components of the second scan line in the previous field with those of the first scan line or the third scan line in the current field if the CUE of the second scan line is detected.

15. The method for motion adaptive de-interlacing with a CUE remover according to claim 9, wherein the step of removing the CUE of the first scan line in the current field comprises:
   detecting the CUE of the first scan line in the current field; and
   swapping color components of the first scan line in the current field with those of a scan line previous to the first scan line or the second scan line in the next field if the CUE of the first scan line is detected.

16. The method for motion adaptive de-interlacing with a CUE remover according to claim 9, wherein the step of removing the CUE of the third scan line in the current field comprises:
   detecting the CUE of the third scan line in the current field; and
   swapping color components of the third scan line in the current field with those of the second scan line or a scan line next to the third scan line in the next field if the CUE of the third scan line is detected.

* * * * *